Figure 1:
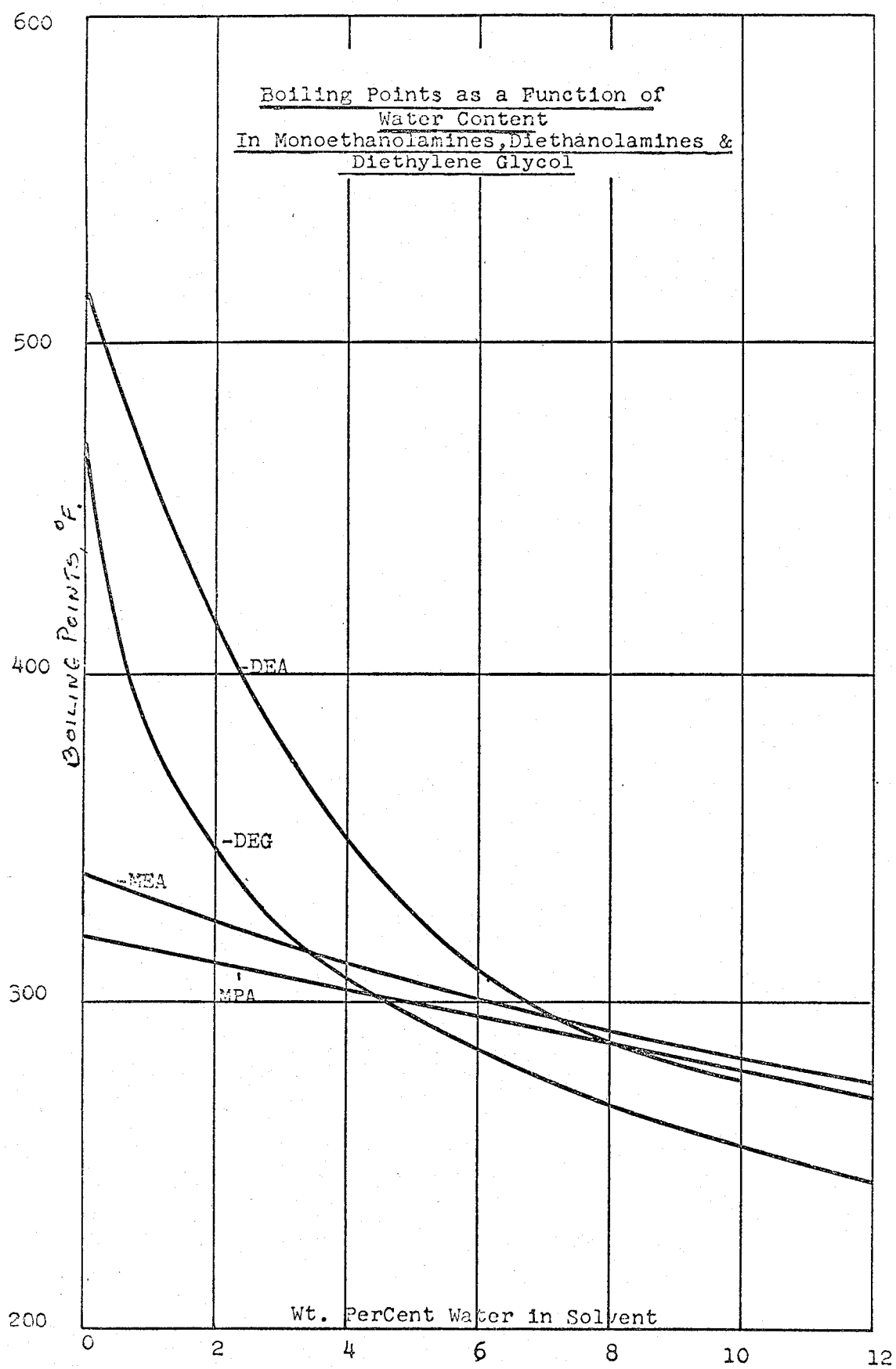

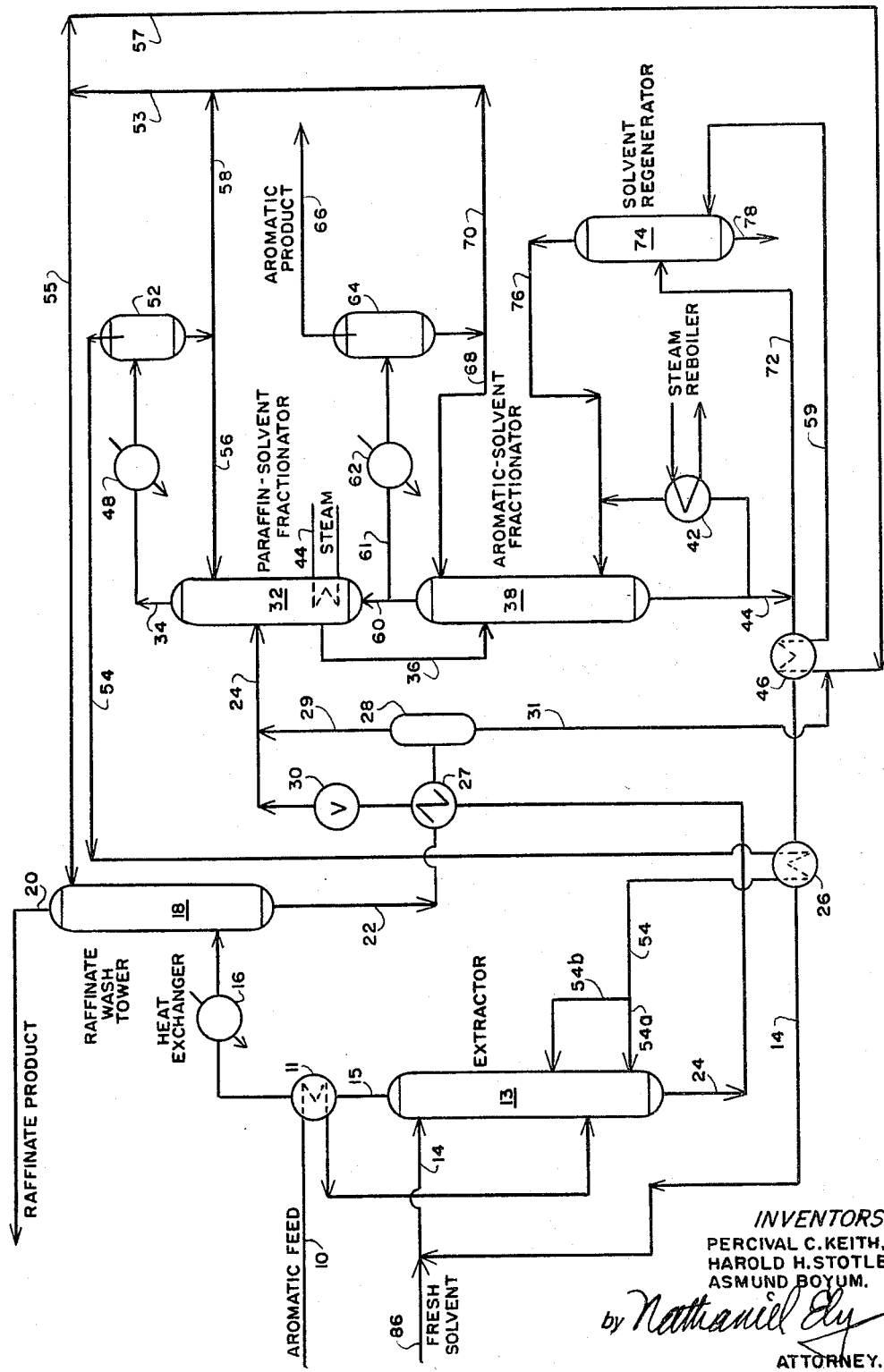

… … … … … … … … … … … … … … … …

3,282,830
SOLVENT EXTRACTION OF AROMATICS WITH AN ALKANOL AMINE SOLVENT
Asmund Boyum, Brooklyn, N.Y., and Harold H. Stotler, Westfield, and Percival C. Keith, Peapack, N.J., assignors to Hydrocarbon Research, Inc., New York, N.Y., a corporation of New Jersey
Filed June 8, 1965, Ser. No. 462,231
4 Claims. (Cl. 208—323)

This invention is a continuation-in-part of the invention disclosed in our copending application, Serial No. 102,979, filed April 14, 1961, now abandoned.

This invention relates to an improved process for the separation by solvent extraction of aromatic, cyclodienic, diolefinic, cycloolefinic, olefinic, naphthenic, and paraffinic hydrocarbons, and recovery of any of these groups in a substantially pure form by utilizing a selective solvent wherein one or more of these groups is selectively dissolved.

More specifically, our invention relates to an improved combined extraction-distillation process for the recovery of aromatic naphthenic, olefinic, and paraffinic hydrocarbons, and recovery of any one of these groups in a substantially pure form by utilizing an aqueous monoalkanolamine as the selective solvent wherein one or more of these groups are selectively dissolved. The process is particularly adapted to the recovery of aromatic hydrocarbons from other types of hydrocarbons, since the aromatics as a group have the highest solubility and paraffins the lowest solubility in the solvent.

As more particularly set forth herein, it is the principal object of our invention to recover aromatic hydrocarbons or any compound being selectively extracted from a mixture of other hydrocarbons with the highest effective commercial yields and with a minimum cost of operation wherein we utilize monoalkanolamines such as monoethanolamine (MEA) and monopropanolamine (MPA) as primary solvents with an anti-solvent such as water, herein called secondary solvent.

The basic process involves contacting the hydrocarbons with the solvent in an extraction zone and distilling off the extracted hydrocarbons in two distillation zones. Since the non-aromatic compounds are more volatile than the aromatics in the presence of the solvent, the non-aromatics are removed from the solvent in the first distillation zone, and the purified aromatics are removed in the second distillation zone. The purified solvent is recirculated to the extraction zone.

A good solvent must, therefore, have a high selective solubility for the aromatic compounds as well as a high relative volatility of non-aromatics to aromatics and a high relative volatility of aromatics to solvent.

Monoalkanolamines have excellent solubilities for aromatics at the same time as they have good selectivity for this group. The amine group in the alkanolamine molecule lends both solubility and selectivity to the solvent; the alcohol group gives further selectivity and the methyl groups give further solubility. MEA thus has, of the monoalkanolamines, the highest selectivity for aromatics while the solubility increases and the selectivity decreases with increasing molecular weight of the monoalkanolamine. As an illustration, the solubility of n-heptane in anhydrous MEA and MPA at 25° C. is 0.4 and 4.9 weight percent respectively while the solubility of toluene, in the same solvents, at the same temperature is 15 and 34 weight percent, respectively.

It is well known that addition of water to a solvent lowers the solubilities of the paraffins more than those of the aromatics and thereby gives the solvent increased selectivity and the mere addition of water to monoalkanolamines to increase the selectivity is therefore not considered part of our invention. However, even anhydrous MEA has good selective solubility for aromatics at the same time as it has very good light-heavy selectivity within a homologous series.

Extraction-distillation processes fall generally into two categories; one in which the solvent is more volatile than the components to be extracted and the solvent is recovered as overhead in the distillation step, and the other in which the solvent is less volatile than the extracted components, and thus recirculating solvent is recovered as bottoms in the distillation step. Numerous writers have stressed that solvents in the second category must have a much higher boiling point or much lower vapor pressure than the heaviest component to be extracted. Thus solvents, seemingly falling in between these two categories, have been discarded by inventors.

The reasons given are usually that the distillation operation becomes too expensive due to excessive vaporization of the solvent. For this type of distillation, however, the lean solvent leaving the last distillation zone must be practically free of hydrocarbons and the vapor pressure of the aqueous solvent must be equal to the operating pressure. It is, therefore, the boiling point of the aqueous and not the anhydrous solvent that determines the relative volatility of hydrocarbons to solvent.

Ignoring sensible heats, the amount of vapors that must be generated by the reboiler is only a function of how much vapor is needed to drive off the aromatics and the paraffins, and it makes little difference in the reboiler duty what portion of the generated vapors is primary and what portion is secondary solvent, except where there is a significant difference in the molar heats of vaporization. Anhydrous MPA and MEA have relatively high vapor pressures, since the atmospheric boiling points of these solvents are about 320° F. and 338° F., respectively, and one would expect the aqueous solvents to boil at a much lower temperature. This could be one reason why these solvents have not been seriously considered for aromatic extraction.

Reference is here made to the only technical paper the applicants have found in which a few qualitative liquid-liquid equilibrium measurements were reported (William B. Hughes and Wayne S. Fallgatter, Paper presented before the Division of Petroleum Chemistry, American Chemical Society, Cincinnati meeting, April 4–7, 1955). The authors concluded, however, that "the comparatively low boiling point of monoethanolamine (171° C. at 757 mm.) makes this material rather unattractive for use with streams containing xylene which boils as high as 144° C." This would have been a correct conclusion if addition of water to the primary solvent led to the usual boiling point depressions.

An important feature of this invention is that the applicants have found that both aqueous MEA and MPA exhibit some unusual behavior. The figure depicts the atmospheric boiling points of diethylene-glycol (DEG), diethanolamine (DEA), MPA and MEA as a function of water content.

Anhydrous MEA has a boiling point 134° F. and 178° F. lower than anhydrous DEG and DEA, respectively. Still with the solvents containing 10 weight percent water, MEA boils at a temperature 27° F. and 7° F. higher than DEG and DEA, respectively. MEA containing more than 3.5 percent water is not only less volatile than DEG with the same water content, but the vapor pressure or the boiling point is rather insensitive to the amount of water added.

This lends a very significant flexibility to the distillation operation in that the temperature of the lean solvent leaving the distillation zone will be fairly steady independent of water concentration in the solvent. Water concentration in MEA or MPA can therefore be selected to give the desired selective solubility for a specific feed, while with DEG and DEA only a very narrow variation of water content could be allowed due to difficulties in the distillation step.

It is furthermore significant to the findings of the applicants and to the economy of the process that the molar heats of vaporization of MPA, MEA, DEA, and DEG are about 20,000, 22,000, 30,000, and 31,700 B.t.u. per mol, respectively. Thus the molar heat of vaporization of MPA and MEA is not much greater than that of water.

Due to strong molecular ties between MEA, MPA, and water, addition of water as secondary solvent, actually lowers the vapor pressures of the primary solvents of MEA and MPA significantly, thus changing the characteristics of the primary solvent molecule. Another anomalous behavior with monoalkanol-water system is that the aqueous solvent has a significantly higher density than either the primary or secondary solvent. This makes phase separation in the extractor easier and increases the capacity of the extractor.

The extraction operation is mainly determined by the solubility and selectivity characteristics of the solvent. The solubility of the aromatics sets the minimum solvent rate for complete aromatic recovery while the selectivity sets the purity of the rich extract leaving the bottom of the extractor. Table 1 presents some solubility and selectivity characteristics for MEA at 11 and 5 weight percent water, and for DEG with 12 weight percent water:

At 350° F. the solubility of benzene in MEA containing 11 percent water is of the order of 40 percent higher than the solubility of benzene in DEG containing 12 percent water, at the same time as the selectivity of MEA is about twice that of DEG. For MEA containing 5 percent water the solubility of benzene is about twice that for DEG containing 12 percent water, while the selectivity is about equal.

The distillation operation is mainly a function of relative volatility or vapor pressure of the hydrocarbons to the volatility or vapor pressure of the aqueous solvent. Table 1 presents some relative volatilities of interest. It is obvious from these numbers that both heptane and benzene are more readily removed from MEA than from DEG by distillation although the relative volatilities are quite favorable for either system. The relative volatility of heptane over benzene is about twice as high in MEA containing 11 percent water as in DEG containing 12 percent $H_2O$, and the benzene at the same time is considerably more volatile in the MEA.

Table 2 presents relative volatilities for heptane-m-xylene-solvent system:

TABLE 2

*Relative volatilities*

[System heptane (H)—M-xylene (X)—solvent (S) at 350° F.]

| Solvent | Wt. Percent $H_2O$ | Mole Fraction In Extract | Relative Volatilities | | |
|---|---|---|---|---|---|
| | | | H–X | H–S | X–S |
| MEA | 11.0 | 0.0 | 13.2 | 189 | 14.3 |
| MEA | 11.0 | 3.0 | 11.9 | 122 | 10.2 |
| MEA | 11.0 | 5.0 | 9.8 | 79 | 8.1 |
| MEA | 5.0 | 0.0 | 11.4 | 168 | 14.7 |
| MEA | 5.0 | 3.0 | 11.5 | 128 | 11.1 |
| MEA | 5.0 | 5.0 | 9.2 | 90 | 9.8 |
| DEG | 12.0 | 1.0 | 7.3 | 55 | 7.5 |
| DEG | 12.0 | 1.87 | 7.8 | 47 | 6.0 |
| DEG | 12.0 | 5.89 | 8.2 | 45 | 5.5 |

The excellent light-heavy selectivity of MEA is clearly shown in that both heptane and m-xylene have about two times higher volatility in MEA than in DEG, at the same time as the relative volatility of heptane to m-xylene is more favorable in MEA. Even butyl-benzene which has a boiling point 25° F. higher than that of anhydrous MEA at 350° F. has a relative volatility of 6.9 and 6.7 in MEA containing 11 and 5 percent water respectively, and a volatility that equals that of xylene in DEG containing 12

TABLE 1

*Liquid-liquid equilibrium data for system, benzene (B)—heptane (H)—solvent (S)*

| Solvent | Wt. Percent Water | Temperature, °F. | Raffinate, Wt. Percent | | Extract, Wt. Percent | | Inverse Solubility [1] | Selectivity [2] | Relative Volatilities [3] In Extract | | |
|---|---|---|---|---|---|---|---|---|---|---|---|
| | | | B | H | B | H | | | H–B | H–S | B–S |
| MEA | 11.0 | 354 | 22.74 | 71.22 | 4.83 | 1.95 | 4.71 | 7.75 | 5.3 | 108 | 21 |
| MEA | 11.0 | 352 | 26.33 | 57.82 | 7.76 | 1.24 | 4.68 | 9.96 | 6.9 | 131 | 19 |
| MEA | 11.0 | 360 | 38.00 | 56.00 | 8.84 | 1.44 | 4.30 | 10.01 | 6.2 | 108 | 17.5 |
| MEA | 5.0 | 357 | 7.26 | 86.18 | 1.87 | 2.75 | 3.85 | 8.14 | 5.6 | 144 | 26 |
| MEA | 5.0 | 358 | 26.19 | 64.44 | 7.50 | 3.53 | 3.49 | 5.23 | 3.6 | 71 | 21 |
| MEA | 5.0 | 355 | 39.91 | 45.00 | 15.52 | 3.62 | 2.57 | 4.83 | 3.3 | 42 | 13 |
| DEG | 12.0 | 350 | 16.6 | 81.0 | 2.30 | 1.70 | 7.22 | 6.60 | 4.5 | 82 | 18 |
| DEG | 12.0 | 350 | 24.8 | 70.8 | 4.3 | 2.60 | 5.77 | 4.72 | 3.3 | 44 | 13 |
| DEG | 12.0 | 350 | 41.1 | 52.2 | 6.8 | 2.1 | 6.04 | 4.12 | 2.8 | 38 | 13.5 |

[1] Inverse Solubility (Wt./Wt.) = $\frac{\text{B in raffinate}}{\text{B in extract}}$

[2] Selectivity (Wt./Wt.) = $\frac{\text{B in extract}}{\text{B in raffinate}} \times \frac{\text{H in raffinate}}{\text{H in extract}}$

[3] Relative Volatility H–B = $\frac{\gamma H P_{oH}}{\gamma B P_{oB}}$ where $\gamma H(B) = \frac{\text{Mol fraction H (B) in raffinate}}{\text{Mol fraction H (B) in extract}}$ Relative Volatility H–S = $\frac{\gamma H P_{oH}}{P_{oS}} X_S$.   $P_o$—vapor pressure of pure component.

Relative Volatility B–S = $\frac{H-S}{H-B}$.   $X_S$—mol fraction solvent in extract phase.

weight percent water. Aqueous MEA can therefore be used to recover benzene homologs boiling at temperatures much higher than the solvent.

Due partly to the low molecular weights, MEA and MPA have excellent thermal stability even at temperatures higher than their atmospheric boiling points. The distillation zones could thus be operated at positive pressures with insignificant losses of solvent due to thermal decomposition even if the solvents were used in anhydrous form. However, operation with anhydrous solvent becomes less attractive due to high mutual solubility of hydrocarbons and solvent in the condensed overhead streams from the distillation zones.

Light aromatics such as benzene are very soluble in anhydrous MEA and MPA and the solvents have a significant solubility in benzene even at room temperature. The phase separation of hydrocarbons and solvent in the condensed overhead streams from the distillation zones would be very poor with a large amount of aromatics dissolved in the solvent phases and a significant amount of solvent in the hydrocarbon phases. The aromatic product would have to be water washed for solvent removal. The strongly aromatic solvent phases would have to be returned to the distillation zones where the dissolved aromatics would be revaporized and thus increase the reboiler duty for even if the solvent was MEA containing 2 weight percent water, the solvent vapor from the distillation zones would contain about 90 weight percent MEA, which still has a significant benzene solubility at room temperature.

With aqueous MEA or MPA as solvents, however, this problem is solved by refluxing some of the condensed aqueous solvent to the distillation zones. Since the relative volatility of water to MEA is in the order of 5 to 10, only a few trays are needed to remove all primary solvent from the overhead vapor streams. The condensed water can then be used to wash solvent from the raffinate phase. The aromatic product directly from the second distillation zone will furthermore be free from primary solvent.

Since the temperature at the bottom of the second distillation zone does not vary much with water content of MEA or MPA, the distillation operation becomes very insensitive to variation in water content. Thus reboiled fractionators can be used even with as low as 1 weight percent water in the solvent. For higher boiling solvents such as DEA or DEG this would not be possible, since there one must rely on vaporization of water from the solvent to drive off the hydrocarbons. Not only would the temperature be so high that thermal decomposition would be of economic significance, but it would be impossible to control the water content of the solvent. The use of open steam or vacuum or both would become necessary, and these operations are expensive. Vacuum operation gives rise to possible air leakage and both glycols and amines deteriorate in oxygen atmosphere.

Further objects and advantages of our invention will appear from the following description of a preferred form of embodiment thereof when taken with the attached drawing which is a schematic flow diagram showing a preferred process for the recovery of aromatics from a mixed aromatic paraffin mixture.

A particular type of hydrocarbon feed contemplated herein consists of a paraffinic-aromatic mixture which includes aromatic fractions such as benzene, toluene, and xylene which it is desired to recover. Such feed in line 10 is heated in heat exchanger 11 before entering the extractor 13 at elevated pressure and temperature. The extractor 13 may be a typical perforated type liquid-liquid extraction tower or other type of extractor.

The solvent, in accordance with our invention, is in aqueous solution of monoalkanolamine which enters extractor 13 at line 14 together with make-up solvent from line 86 if necessary. Such solvent then forms two liquid layers with the hydrocarbon feed. The aromatic rich extract is removed from the bottom through line 24 and a paraffin rich raffinate is taken overhead at line 15 through heat exchanger 11 and this, in turn, cools the raffinate. The raffinate may be further cooled in heat exchanger 16 and is then introduced into the raffinate wash tower 18, wherein it is water washed for solvent removal. The raffinate containing substantially all of the paraffins with no substantial amount of aromatics or solvent is then removed from tower 18 through line 20 to storage.

The solvent and water from wash tower 18 is removed as bottoms in line 22 through a small heat exchanger 27 where any dissolved hydrocarbons are vaporized to form a vapor and liquid phase in drum 28. The vapor in line 29 is passed to the rich solvent extract in line 24.

This rich solvent removed from extractor 13 through line 24 is, after passing through heat exchanger 27 and pressure reducing valve 30, fed to an intermediate point of the paraffins-solvent fractionating tower 32, where substantially all of the paraffins in the extract are distilled off through line 34 as overhead. The remaining solvent phase is withdrawn through drawoff 36 into an intermediate point of the aromatic-solvent fractionator 38.

The paraffin containing stream 34 then passes through heat exchanger 48 wherein it is cooled and condensed so that it will form two liquid layers in drum 52. From this drum the paraffin rich upper layer is removed through line 54 and after passing through heat exchanger 26 is recycled in line 54a to the lower part of the extractor 13, where the stream serves partly to re-extract heavier paraffins from the descending extract phase. If, however, the aromatic content in the reflux stream 54 is lower than the aromatic content in the feed, the reflux stream would be fed to the extractor 13 at 54b, an intermediate point, and the feed 10 would be fed to the bottom of the extractor. Some of the heavy paraffins in the feed would then go into the rich solvent, but due to the excellent light-heavy selectivity of aqueous MEA, no problem in fractionating these heavy paraffins from the solvent would be encountered.

Heat to the bottom of the paraffin-solvent fractionator 32 is in the figure shown to be either steam through reboiler 44 or hot aqueous product vapors in line 60. Only one of these alternates would be used for the optimum process conditions. Steam reboiling of tower 32 would allow one to vary the pressure of tower 32 independent of tower 38, and would be used where the extractor feed 10 is a wide boiling mixture containing significant amounts for example of xylene, ethyl-, propyl- or butyl-benzene. Due to the low solubililty of these components in the aqueous MEA, it would be of importance to keep the amount of these components in the recycle stream 54 to a minimum since whatever aromatics are recycled to the extractor has to be re-extracted. The pressure in tower 32 would then be adjusted to give no flashing of rich extract solvent across pressure reducing valve 30, since these conditions would give maximum separation of paraffins and aromatics in tower 32.

The aqueous aromatic product vapor stream is removed as overhead from tower 38 through line 60. At least part of this vapor stream at 61 is cooled and condensed in exchanger 62 so that it will form two liquid layers in accumulator drum 64. The aromatic product, free of primary solvent, is removed through line 66.

The solvent free water in drum 52 is removed from the lower liquid layer, and part of this water is fed through line 56 as reflux to tower 32 to secure removal of primary solvent in vapor stream 34. Likewise a part of the water from drum 64 is used as reflux in line 68 for tower 38 to secure removal of primary solvent from vapor stream 60, thus giving both aromatic product and water free of primary solvent in drum 64.

The lean solvent, practially free from aromatic and paraffinic hydrocarbons and with desired water content, is removed from the bottom of tower 38 through line 44. It is cooled in exchangers 46 and 26 before being recirculated to the top of the extraction zone through line 14. This gives a non-isothermal operation of the extraction-distillation combination. Without non-isothermal operation, a significant amount of hydrocarbons tend to flash off in the pressure let down through valve 30. Flashing is a very poor separation method and gives rise to high aromatic content in the reflux stream and thereby increased reboiler duty.

A small slip stream of lean solvent is, through line 72, fed to the solvent regenerator 74, which is primarily only a flash drum, where the primary and secondary solvent is vaporized and recirculated as vapors through line 76 to tower 38. Thus all of the heat input in solvent regenerator 74 is being reutilized as heat duty in tower 38, which results in a significant reduction in reboiler duty in steam reboiler 42 necessary for this tower. High boiling deterioration products are periodically removed as bottoms through line 78.

Excess water from drum 52 and from drum 64 is removed through line 53. Part of this water is fed through line 55 to the top of raffinate wash tower 18, where the water in countercurrent flow with the raffinate removes primary solvent dissolved in the raffinate phase.

The remaining water in line 53 through line 57 and solvent containing water in line 31 from raffinate washer is passed to heat exchanger 46 where the solvent containing water is vaporized, passed through line 59 to solvent regenerator 74, where the primary solvent from line 72 is easily flashed into the water vapors and carried out as overhead through line 76 and recirculated to the aromatic-solvent fractionator bottoms as vapors.

This operation results in several important advantages. Vacuum operation of the solvent regenerator 74 becomes unnecessary, since the partial pressure of solvent in the vapors passing through line 76 is in the order of 1 to 3 p.s.i.a. Without use of open steam in the regenerator 74, the tower would, therefore, have had to be operated at that pressure at the same temperature. Since vacuum is avoided, no reboiler steam is wasted in regenerator 74, since the heat content of both primary and secondary solvent is being reused in vapors in tower 38. Elimination of vacuum equipment and air leakages is of significance in our invention also in that it reduces solvent losses. The open steam used to avoid vacuum operation in solvent regenerator 74, has been generated entirely within the system, and thus will have no upsetting effect on the water balance or the water content of the solvent. It has given non-isothermal operation of the extraction and fractionation combination without waste of sensible heat in cooling of the recirculating lean solvent.

The preferred water contents of MEA or MPA are between 2 and 20 weight percent. The lower number is set merely as a practical limit to enable one to obtain pure water from the condensed vapor streams from the distillation zones. Above 20 weight percent water, the solubility of aromatics in the solvent becomes low, and solvent circulation becomes unnecessarily high.

The pressure in the distillation zones 32 and 38 would vary from 1 to 3 atmospheres, the higher pressure being preferred when it is desirable to extract very heavy aromatics of the benzene series. These conditions automatically fix the temperature in the bottom of the lower distillation zone 38 between about 270 and 350° F. Preferred operating temperature in the extractor 13 is between 250–340° F.

In a typical example where monoethanolamine containing 11 weight percent water is used at 300° F. with a solvent to feed ratio of 8.8 to 1 (vol./vol.), the following yields were obtained in pilot plant operation with 10 actual perforated trays:

|  | Composition, Weight Percent (Solvent-Free Basis) | | |
| --- | --- | --- | --- |
|  | Feed | Raffinate | Product |
| Non-aromatics | 59.4 | 98.0 | <0.1 |
| Benzene | 20.8 | <0.1 | 52.6 |
| Toluene | 5.6 | 0.2 | 13.9 |
| Xylene | 14.2 | 1.7 | 33.4 |
|  | 100.0 | 100.0 | 100.0 |

The extraction zone 13 is constantly maintained under sufficient pressure such that all components are maintained in liquid form. In general, this will require a pressure in the order of 50 to 200 p.s.i.g. depending on the water content in the solvent and the vapor pressure of the hydrocarbons in the feed.

It will be understood that in describing this invention, preferred operating examples have been given, but that departure therefrom which may be accomplished within the skill of the art are considered to be within the scope and spirit of the invention as described herein and as claimed hereinafter.

We claim:
1. A continuous process for recovering a mixture of aromatic hydrocarbons, substantially free of non-aromatics, from a mixture of hydrocarbons comprising the steps of contacting said feed mixture in an extraction zone at temperatures ranging from 250° to 340° F. and under sufficient pressure to keep the flowing contents liquid, with a solvent mixture consisting essentially of an aqueous solution of a monoalkanolamine selected from the group consisting of monoethanolamine and monopropanolamine and mixtures thereof in which the water content is in the order of 2 to 20 weight percent and the ratio of aqueous solvent to hydrocarbons is in the order of 2 to 1 to 20 to 1 by weight, so as to form separable raffinate and extract phases, removing and cooling the raffinate phase, water washing said raffinate phase to remove solvent in the raffinate, removing said extract phase, distilling said extract phase to remove substantially all of the non-aromatic hydrocarbons, recycling said non-aromatic hydrocarbons containing some aromatic hydrocarbons to the extraction zone, further distilling said extract phase to remove aromatic hydrocarbons substantially free of non-aromatics, said distillation steps being operated in the pressure range of 1 to 3 atmospheres and at temperatures in the range of 270° to 350° F.

2. The process of claim 1 wherein the monoalkanolamine is monoethanolamine.

3. The process of claim 1 wherein the monoalkanolamine is monopropanolamine.

4. The process of claim 1 wherein the monoalkanolamine is a mixture of monoethanolamine and monopropanolamine.

References Cited by the Examiner
UNITED STATES PATENTS
2,770,663 11/1956 Grote _____ 208—333
2,904,508 9/1959 Hughes et al. _____ 260—674

DELBERT E. GANTZ, *Primary Examiner.*

H. LEVINE, *Assistant Examiner.*